United States Patent
Yasuda (10) Patent No.: US 9,507,550 B2
(45) Date of Patent: Nov. 29, 2016

(54) IMAGE FORMING APPARATUS, IMAGE FORMING SYSTEM, AND NON-TRANSITORY COMPUTER READABLE MEDIUM STORING PROGRAM

(71) Applicant: FUJI XEROX CO., LTD., Tokyo (JP)

(72) Inventor: Shunichi Yasuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/878,524

(22) Filed: Oct. 8, 2015

(65) Prior Publication Data
US 2016/0246554 A1 Aug. 25, 2016

(30) Foreign Application Priority Data
Feb. 24, 2015 (JP) .................................. 2015-033697

(51) Int. Cl.
*G06F 3/12* (2006.01)
*H04N 1/00* (2006.01)
*G06K 9/00* (2006.01)

(52) U.S. Cl.
CPC ............ *G06F 3/1238* (2013.01); *G06F 3/1222* (2013.01); *G06F 3/1236* (2013.01); *G06F 3/1292* (2013.01); *G06K 9/00362* (2013.01); *H04N 1/00251* (2013.01); *H04N 1/00307* (2013.01); *H04N 1/00411* (2013.01)

(58) Field of Classification Search
USPC ....................................................... 358/1.14
See application file for complete search history.

(56) References Cited

U.S. PATENT DOCUMENTS

| | | | | |
|---|---|---|---|---|
| 2009/0313493 A1* | 12/2009 | Ide | ........................ | G06F 1/3203 713/323 |
| 2013/0176594 A1* | 7/2013 | Tanaka | ..................... | H04N 1/04 358/1.15 |
| 2014/0139873 A1* | 5/2014 | Ishida | ................... | H04W 4/008 358/1.15 |
| 2015/0201091 A1* | 7/2015 | Yokoyama | ......... | H04N 1/00106 358/1.15 |

FOREIGN PATENT DOCUMENTS

| | | |
|---|---|---|
| JP | 2010-041563 A | 2/2010 |
| JP | 2010-057090 A | 3/2010 |
| JP | 2013-229895 A | 11/2013 |

OTHER PUBLICATIONS

Atshushi, Network System Image Forming Device Program and Image Data Transmission/Reception Method, Jul. 11, 2013, Machine Translated Japanese Patent Application Publication provided in IDS, JP2013229895, all.*

* cited by examiner

*Primary Examiner* — Ngon Nguyen
(74) *Attorney, Agent, or Firm* — Oliff PLC (57) ABSTRACT

Provided is an image forming apparatus, including an image reading device, a display unit that displays operation information of a user, a wireless communication unit that wirelessly communicates with a terminal of the user, and a unit that acquires terminal information of the terminal by the wireless communication unit, wherein when proximity of the terminal is detected by the wireless communication unit, operation information for transmitting image data read by the image reading device to the terminal is added to the display unit.

18 Claims, 11 Drawing Sheets

IMAGE FORMING APPARATUS, IMAGE FORMING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2015-033697 filed Feb. 24, 2015.

BACKGROUND (i) Technical Field

The present invention relates to an image forming apparatus, an image forming system, and a non-transitory computer readable medium storing a program.

(ii) Related Art

In the related art, a technology in which a scanner or a printer of an image forming apparatus or the like is conveniently used by a mobile terminal is known.

SUMMARY

According to an aspect of the invention, there is provided an image forming apparatus, including:

an image reading device;

a display unit that displays operation information of a user;

a wireless communication unit that wirelessly communicates with a terminal of the user; and a unit that acquires terminal information of the terminal by the wireless communication unit, wherein when proximity of the terminal is detected by the wireless communication unit, operation information for transmitting image data read by the image reading device to the terminal is added to the display unit.

BRIEF DESCRIPTION OF THE DRAWINGS

Exemplary embodiments of the present invention will be described in detail based on the following figures, wherein.

DETAILED DESCRIPTION

Hereinafter, an aspect for embodying the present invention (hereinafter, referred to as an exemplary embodiment) will be described with reference to the drawings.

Concept of System

Figure 1:
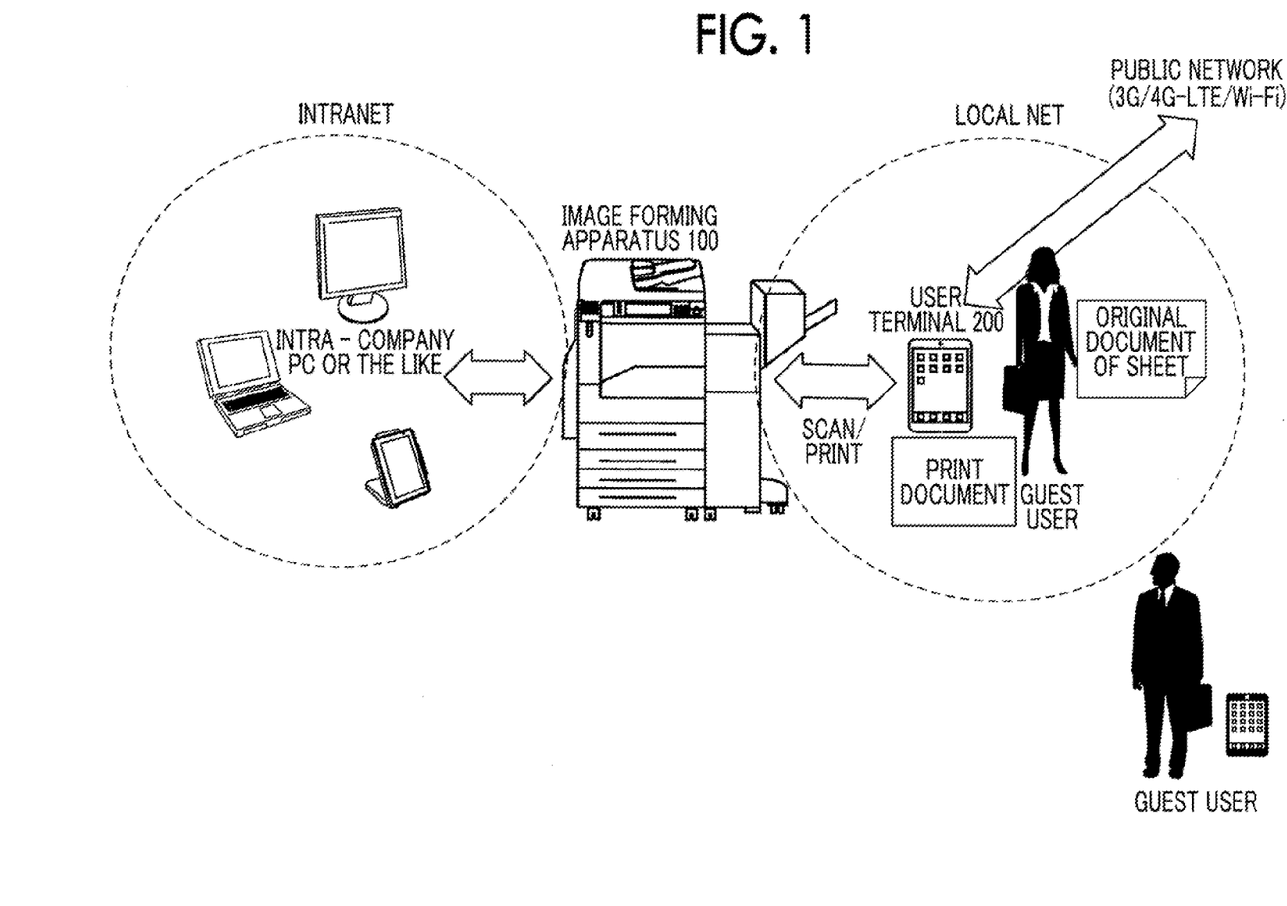
FIG. 1 is a diagram showing an aspect of a use of a system according to an exemplary embodiment of the present invention.

FIG. 1 is a diagram showing an aspect of a use of an image forming system according to the exemplary embodiment of the present invention. In the present system, a desktop PC, a notebook PC, a tablet, or the like positioned in a company is connected to an image forming apparatus 100 via an inter-company network (intranet), and visitors or members or the like of other departments or other business offices (referred to as a guest user) may temporarily use the image forming apparatus 100. In the present system, the guest user (hereinafter, may be simply referred to as a user) may easily use a scanning function or a printing function of the image forming apparatus 100 without performing advance preparation such as setting.

The guest user performs connection with respect to the image forming apparatus 100 using a network that uses a communication unit separate from a communication unit for connecting an intranet in a company. Here, the network that uses the separate communication unit is referred to as a "local network". The image forming apparatus 100 and a user terminal 200 are connected to each other by an ad-hoc wireless communication unit (for example, Bluetooth (registered trademark)) for a relatively short range having a communication range of approximately 10 m. In addition, the user terminal 200 is connected to an external network by a public network such as 3G, Long Term Evolution (LTE), or Wi-Fi (registered trademark). However, in order to ensure security, in the image forming apparatus 100, an intranet of a user in a company and the local network of the guest user are used so as to be independent with each other.

A user of the image forming apparatus 100 (referred to as the present apparatus) has the mobile user terminal (may be simply referred to as a terminal) 200 such as a smart phone or a tablet, and the present apparatus detects that the user terminal 200 moves into a communication range (for example, approximately 10 m) of the present apparatus, using a short range wireless communication unit that wirelessly communicates with the terminal, at a relatively short range. In this case, the detection of the terminal is performed in a state where the user terminal 200 is put in a bag or the like. Accordingly, it is unnecessary to take the user terminal 200 out of the bag or the like. When a user (user terminal 200) further approaches the present apparatus and moves into a predetermined range (for example, approximately 2 m or less), it is recognized that an owner of the terminal is a user of the present apparatus.

When the user terminal 200 moves into a proximity range and the present apparatus recognizes that an owner of the user terminal is the user, communication application (dedicated application for directly exchanging data with the present apparatus) on the terminal is automatically operated. The present apparatus acquires ID information or the like of the terminal by communication between the present apparatus and the communication application. In this case, on a function selection menu of an operation panel of the present apparatus, a button of "tablet scan" indicating a case where a scanning function of the present apparatus may be directly used from the terminal, and a button of "tablet print"

indicating a case where a printing function of the present apparatus may be directly used are automatically added. Here, a user directly using the present apparatus means that the user uses functions of the present apparatus without performing any operation with respect to the user terminal 200.

For example, when a user selects the "tablet scan" from the operation panel of the image forming apparatus 100, an operation screen is changed, a display of urging the user to set an original document to an automatic paper feeding mechanism or to place an original document on an original document reading plate is performed, and a name (a model name or a popular name) of the user terminal 200 that becomes a transmission destination, an ID name (a name of the terminal that is provided by the user), an image (an icon or the like) of the terminal are displayed. When the model name or the like is not clear, an image of a default may be displayed.

When the user sets the original document, the operation screen is changed to a display of urging the user to press a start button of the present apparatus, and if the user presses the start button, scanning starts. In this case, selection of double-side/single-side, correction of direction/inclination of the original document, an appropriate compression method, or the like is automatically performed by an "auto-scan" function, and transmission conditions are displayed. When the transmission is completed, a screen display issues transmission completion, corresponding application according to format of the transmitted image data is actuated, and an initial page is displayed on the user terminal 200. Accordingly, unlike the related art, advance preparation is not required in which the user searches the image forming apparatus 100 after a manager performs a required setting.

Meanwhile, if a user selects the "tablet print" from menus of the operation panel of the present apparatus, the operation screen is changed, and similarly to the case of the scanning, the name of the user terminal 200, the ID name, the image of the terminal, or the like is displayed, and a document having format that may be printed by the present apparatus is displayed as a list. However, data of a print document is stored in the user terminal 200 in advance.

In addition, when the user selects a document to be printed and presses the "start button", printing starts. In this case, print data of the document selected by the user terminal 200 is transmitted to the image forming apparatus 100, and the "tablet print" is performed from the terminal. Thereafter, the user retrieves a paper that is discharged to an exit tray. Accordingly, unlike the related art, advance preparation is not required in which when a user performs printing using an image forming apparatus at a customer, setting that is required when the user searches a printer driver matching to a model and installs the printer driver, admittance of a manager, or the like is necessary.

Hardware Configuration of Image Forming Apparatus

Figure 2:
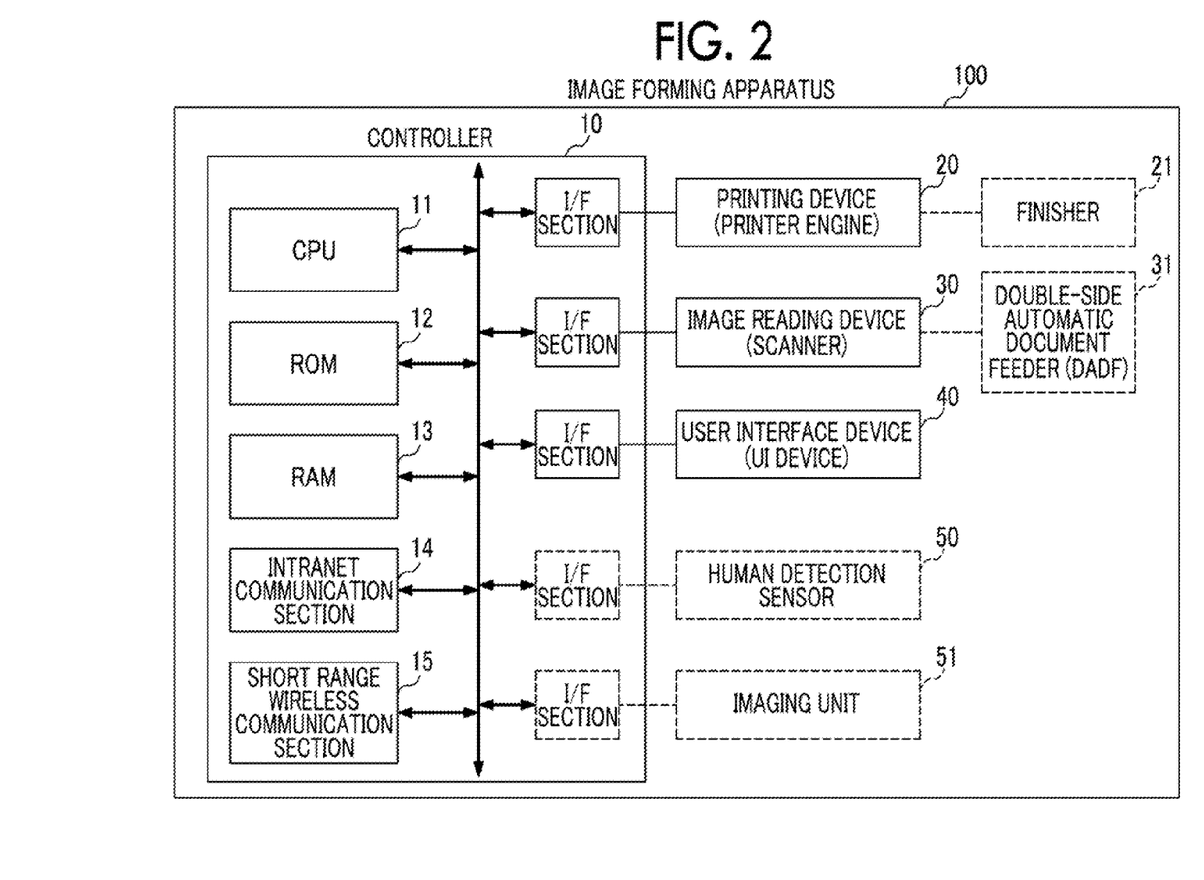
FIG. 2 is a diagram showing a hardware configuration of an image forming apparatus according to the exemplary embodiment of the present invention.

FIG. 2 is a diagram showing a hardware configuration of the image forming apparatus 100 according to the exemplary embodiment of the present invention. The image forming apparatus 100 mainly includes a controller 10 that is a device of controlling the entire apparatus, a printing device 20, an image reading device 30, and a user interface device 40.

The printing device 20 is referred to as a printer engine, is a mechanism that performs a printing function of the image forming apparatus 100, and may optionally include a finisher 21 that performs post-processing such as assortment, folding, stapling (Hotchkiss), saddle-stitching of printed sheets.

The image reading device 30 is a scanner that reads an image of a medium such as a sheet, preferably, includes an automatic paper feeding mechanism (Automatic Document Feeder (ADF)), and more preferably, includes a double-side automatic document feeder (Duplex ADF (DADF)).

The user interface device 40 (hereinafter, abbreviated as a UI device 40) is an operation panel or the like that receives an operation input from a user, or notifies a user of screen display, and typically, is configured of a touch panel and physical switches and the like. In addition, the UI device 40 may include a voice input and output function.

The controller 10 includes a Central Processing Unit (CPU) 11, a Read Only Memory (ROM) 12, and a Random Access Memory (RAM) 13, controls the entire apparatus, and is connected to the printing device 20, the image reading device 30, the UI device 40, or the like via each internal interface section (I/F section). In addition, the controller 10 has a function that communicates with the outside. Accordingly, a communication unit is divided into an intranet communication section 14 that controls communication between an intra-company PC or like and the communication unit so as to connect with the above-described intranet, and a short range wireless communication section 15 that is the local network and performs short wireless communication between the user terminal 200 of the guest user and the communication section 15. The intranet communication section 14 may be a general interface such as Ethernet (registered trademark) or a Universal Serial Bus (USB) regardless of a wire system or a wireless system.

As described above, the short range wireless communication section 15 is a wireless communication unit for a relatively short range having a communication range of approximately 10 m, and preferably, is a communication unit such as Bluetooth (registered trademark) LE (Low Energy)/4.0 in which an approach range with respect to an opposite device may be discriminated and a presetting such as pairing is not required, for example. In addition, the short range wireless communication section 15 has a function that detects the user terminal 200 that has moved into a wireless communication range (also referred to as a first range), and thereafter, detects the user terminal. 200 that has further approached the image forming apparatus 100 and has moved into a proximity range (also referred to as a second range). Accordingly, the user terminal 200 that is stationary during a certain period of time (for example, approximately several seconds to ten seconds) within the proximity range is recognized as a terminal of the guest user. As described above, when the controller 10 detects the guest user, a menu for storing a function of directly performing printing from the user terminal 200 or scanned image data is added to the UI device 40.

In addition, as another option, the controller 10 may include a human detection sensor 50 or an imaging unit 51 such as a camera. Accordingly, the controller 10 may detect a user who stands before the present apparatus and image an appearance of the user so as to more clearly distinguish whether the user is a person who merely passes or a user who wants to use the present apparatus. In addition, the imaging unit 51 may be a face recognition camera that recognizes a face of a human and detects his or her eyes. In this case, by detecting the user's eyes being directed to the operation panel of the present apparatus, it may be determined that the user is a user of the present apparatus. Moreover, as an option, the image forming apparatus 100 may include a storage device that accumulates print jobs, a large capacity paper feeding mechanism, a device that reads a card or various storage media, or the like. However, here, descriptions thereof are omitted.

Image Forming Apparatus and Functional Configuration of User Terminal

Figure 3:
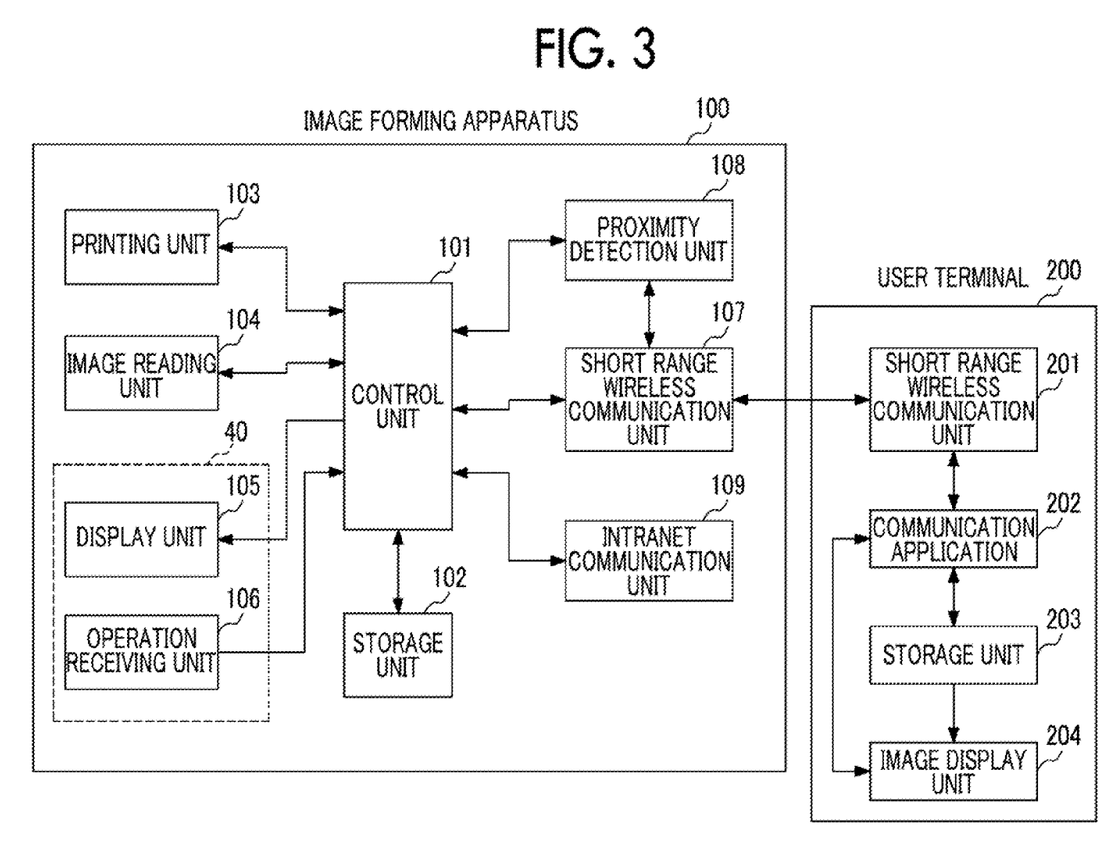
FIG. 3 is a diagram showing functional configurations of the image forming apparatus and a user terminal according to the exemplary embodiment of the present invention.

FIG. 3 is a diagram showing functional configurations of the image forming apparatus 100 and the user terminal 200 according to the exemplary embodiment of the present invention.

Image Forming Apparatus

As shown as one functional configuration, the image forming apparatus 100 includes a control unit 101, a storage unit 102, a printing unit 103, an image reading unit 104, a display unit 105, an operation receiving unit 106, a short range wireless communication unit 107, a proximity detection unit 108, and an intranet communication unit 109. The control unit 101 controls the entire apparatus by a program stored in the storage unit 102. Various data is stored in the storage unit 102 in addition to a program. The printing unit 103 controls the printing device 20, analyzes received print data, and generates a print image data (raster image). The image reading unit 104 controls the image reading device 30, and temporarily stores the scanned image data in the storage unit 102. The display unit 105 and the operation receiving unit 106 control the UI device 40, and perform a function that displays an operation menu or an operation guide for a user or receives an operation input.

The short range wireless communication unit 107 controls wireless communication between the user terminal 200 and the short range wireless communication unit 107, detects the user terminal 200 that is positioned within the communication range, and communicates with the terminal. In addition, the proximity detection unit 108 acquires information from at least one of the human detection sensor 50 and the imaging unit 51, and discriminates approaching of a user or a user who stands before the operation panel. Moreover, by measuring radio wave intensity of wireless communication or the like, when the short range wireless communication unit 107 detects that a range between the user terminal 200 and the short range wireless communication unit 107 is within the proximity range, the short range wireless communication unit 107 instructs the display unit 105 to display a dedicated button, which is an operating unit selecting the "tablet scan" or the "tablet print" described before, so as to be added to the operation menu. In this case, accuracy of user detection may be increased by using information that is acquired by the human detection sensor 50 and the imaging unit 51. That is, the measurement of the radio wave intensity between the short range wireless communication 107 and the terminal and the detection information of the human detection sensor 50 and the imaging unit 51 may be combined to each other so as to function as the proximity detection unit 103 that detects proximity of the terminal.

The intranet communication unit 109 controls communication between an intra-company PC of a user in the intranet or the like and the intranet communication unit 109. In addition, the control unit 101 controls the short range wireless communication unit 107 and the intranet communication unit 109 so as to be independent to each other and security of communication is ensured. Accordingly, even when a user in company who does not have the user terminal 200 having functions described below approaches the present apparatus, the user is not regarded as the guest user, and the addition of the dedicated operation menu of the guest user described above is not performed. In addition, it is possible to prevent the guest user who uses the present apparatus from accessing the intranet in a company from the user terminal 200.

User Terminal

As shown in the drawings, the user terminal 200 includes a short range wireless compunction unit 201, a communication application 202, a storage unit 203, and an image display unit 204. However, function sections impertinent to the present invention are omitted.

The short range wireless communication unit 201 communicates with the short range wireless communication unit 107 of the image forming apparatus 100, and transmits at least one of a model name or a popular name of the user terminal 200, an ID name (a name of the terminal that is provided by a user), and an image of a model at a timing when the communication is established or a timing when proximity of the terminal is detected. When the image of the model is held in the terminal, the image may be transmitted. Particularly, in order to easily distinguish terminals of other users, in a state where the image of the terminal to which a unique decoration is applied by the user is held, the user may transmit the image to the present apparatus. When the image of the model is not held in the terminal, the present apparatus may search an image from the model name using Web. Alternatively, the image of the model is not displayed, and a home screen of the terminal or an image of a standby screen may be displayed.

The communication application 202 is a dedicated application of the image forming apparatus 100, and is downloaded from a Web site of a terminal maker or the like and is installed. The communication application 202 includes driver functions of a printer and a scanner of the image forming apparatus 100, and includes a unit that searches a folder configuration of the storage unit 203 of the terminal, an image receiving unit that receives image data read by the scanner, a unit that stores the received image data in the storage unit 203 and a cloud in the terminal, a document list preparation unit that searches a printable document in a folder and prepares a document list, a unit that generates print data of a selected document and transmits the data to the image forming apparatus 100, or the like. In addition, the printable document is considered as a general document that is prepared by PDF, WORD, or the like. However, the printable document is not limited to this. In addition, the image display unit 204 is a touch panel that displays an image data which the communication application 202 receives from the image forming apparatus 100 and an image data stored in the storage unit 203, or the like. Image display units (operation display units) are provided on both the image forming apparatus side and the terminal side. However, the guest user of the present apparatus performs scanning or printing by only the operation display unit of the image forming apparatus side.

In addition, preferably, the communication application 202 is automatically actuated according to the image forming apparatus 100 and the user terminal 200 approaching each other. Alternatively, the communication application 202 may be actuated in advance according to communication being established. In addition, when a pass code is set to the terminal, preferably, a function of inputting the pass code from the operation panel of the image forming apparatus 100 and performing authentication is provided. Accordingly, a user need not take each user terminal 200 out of a bag or the like whenever the user performs scanning or printing.

Hereinbefore, the functional configurations of the image forming apparatus 100 and the user terminal 200 are described. However, the functional configurations are examples, and one functional block may be divided, or plural functional blocks may be collected so as to configure one functional block. A CPU included in an apparatus reads a program stored in a program memory or a program provided from a storage medium or a network and a computer included in the apparatus executes the program. Accordingly, a processing section of each functional block is realized.

Processing Flow and Operation Screen Display Example

Figure 4:
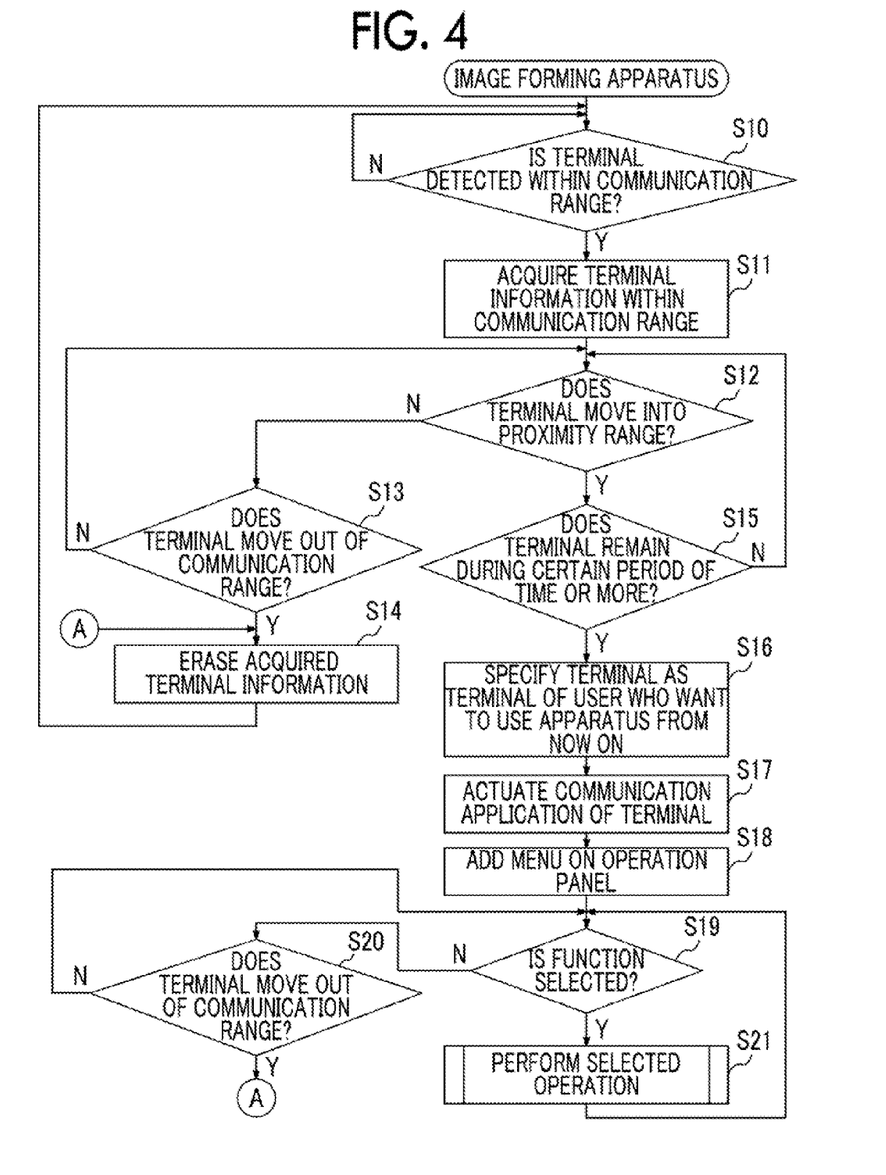
FIG. 4 is a diagram showing a flow of main processing of the image forming apparatus.

FIG. 4 is a diagram showing a flow of main processing of the image forming apparatus 100. The image forming apparatus 100 (hereinafter, simply referred to as an apparatus) detects all user terminals 200 (hereinafter, simply referred to as terminals) that are positioned within the communication range (within the first range) to recognize the surrounding environment (Step S10). In addition, the terminal information detected within the communication range is acquired (Step S11). Here, the acquired information may be an ID name (a name of a terminal that is provided by a user) or a model name (or popular name) of a terminal, and may include a model name, a serial number, and an image or an icon of the terminal. In addition, the model image of the terminal, the image of the icon or the like may be acquired by searching Web. Here, the acquired terminal information is reflected to the operation information and is displayed on the display unit of the apparatus. For example, the terminal information is displayed on an operation menu or an operation button using an image or a character.

Next, it is determined whether the terminal further approaches the apparatus and moves into the proximity range (within the second range) (Step S12). When the terminal does not move into the proximity range and moves out of the communication range (Step S13: Y), it is determined that the user is a person who simply passes, and the acquired terminal information is erased (Step S14). However, from the viewpoint of security, the terminal information of the terminal that is actually connected is encoded and may remain as history.

Meanwhile, when the terminal moves into the proximity range (Step S12: Y), in Step S15, it is determined whether or not the terminal remains within a proximity range during a certain period of time (for example, several seconds to ten seconds). Here, an approximate distance between the user or the terminal and the apparatus may be measured by communication density of radio waves. However, the range may be more accurately measured using the proximity detection unit 108. In Step S15, when it is detected that the terminal remains in the proximity range during a certain period of time, the terminal is specified as a terminal of a user who wants to use the apparatus from now on (Step S16). In this case, an image of an appearance or a face of a user being captured by the proximity detection unit 108 may be confirmed. When plural terminals exist within the proximity range, a terminal approaching the apparatus in advance is prioritized, and other terminals may not be recognized.

Figure 7:
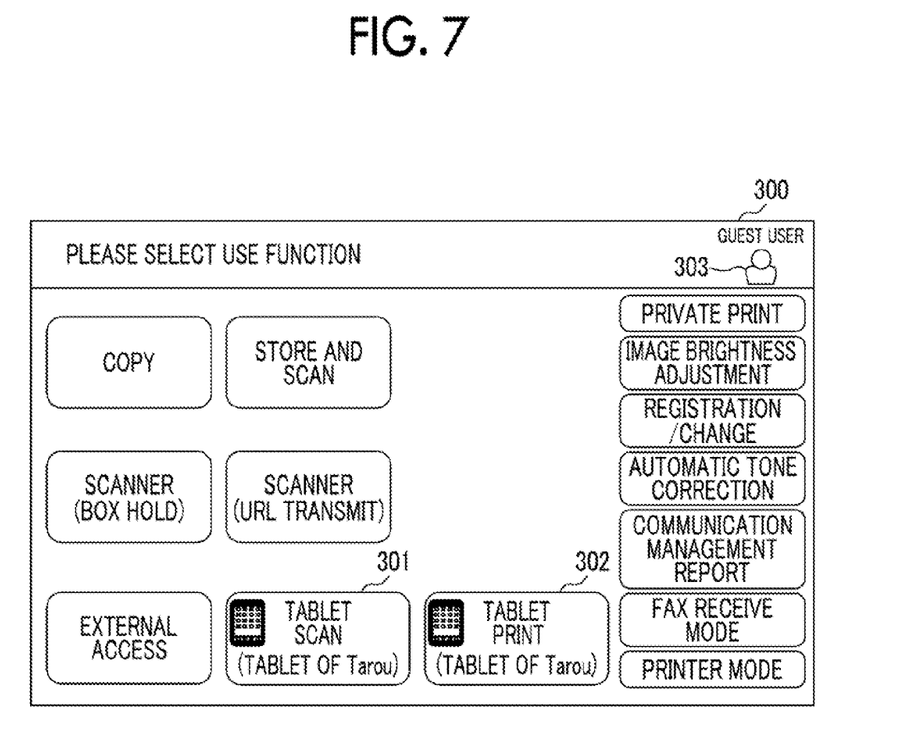
FIG. 7 is a diagram showing a display example of an operation panel of a function selection menu.
Figure 8A:
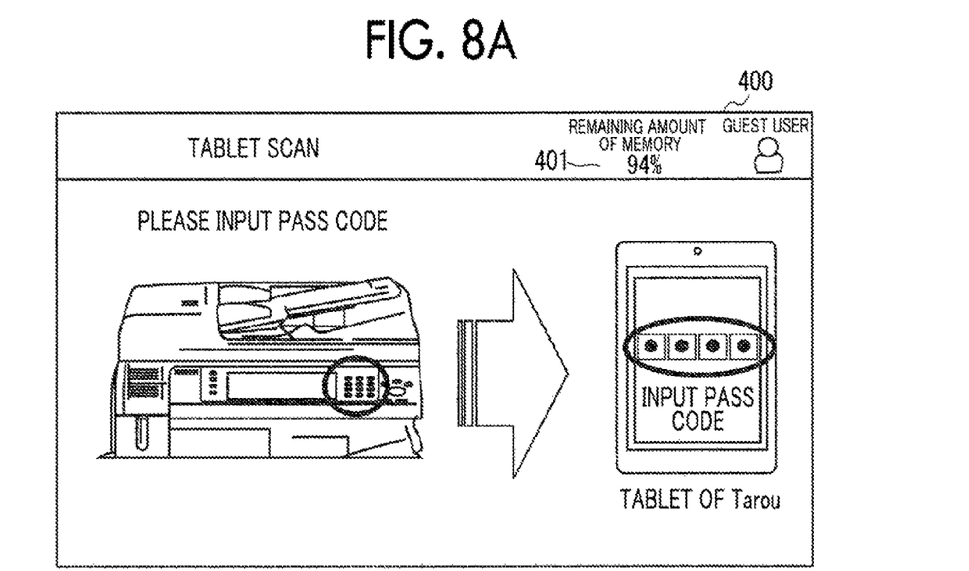
FIGS. 8A and 8B are diagrams showing a display example of an operation panel when scanning of a tablet starts.
Figure 8B:
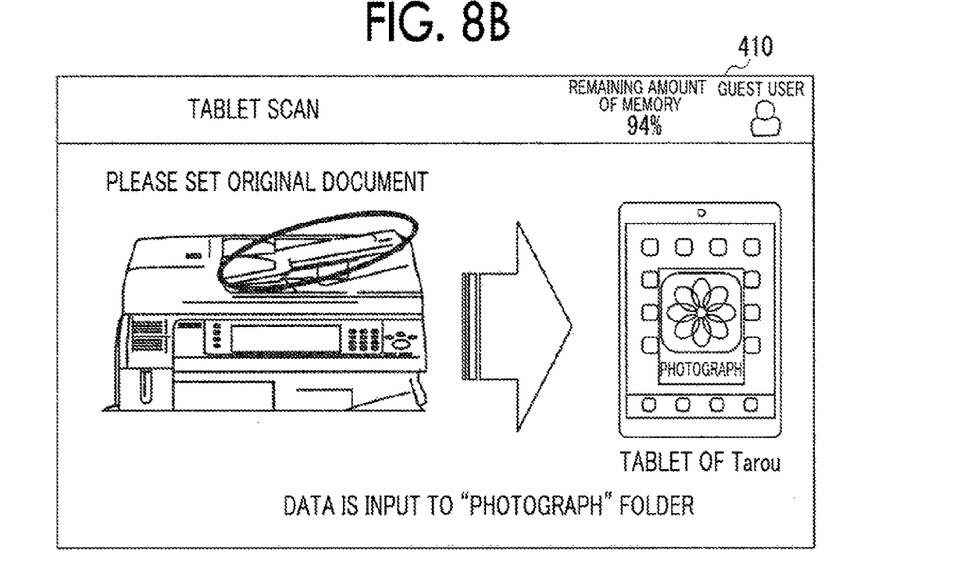
Figure 9A:
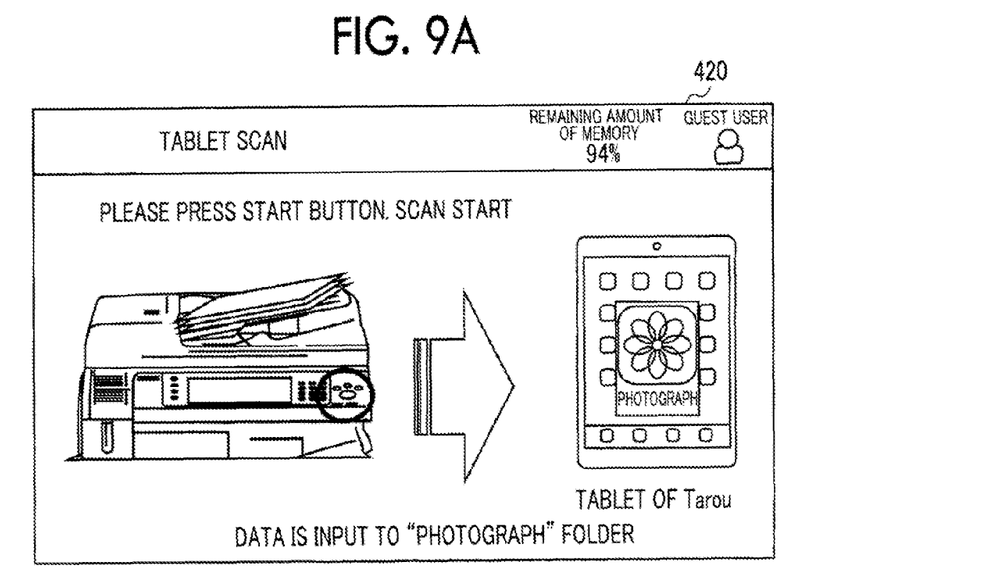
FIGS. 9A and 9B are diagrams showing a display example of the operation panel during scan processing of the tablet.
Figure 9B:
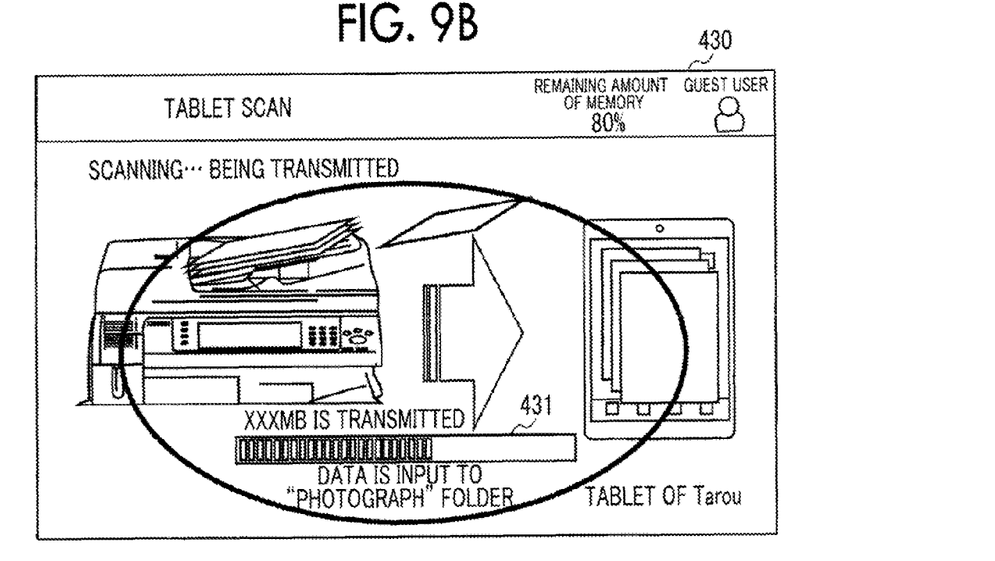
Figure 10:
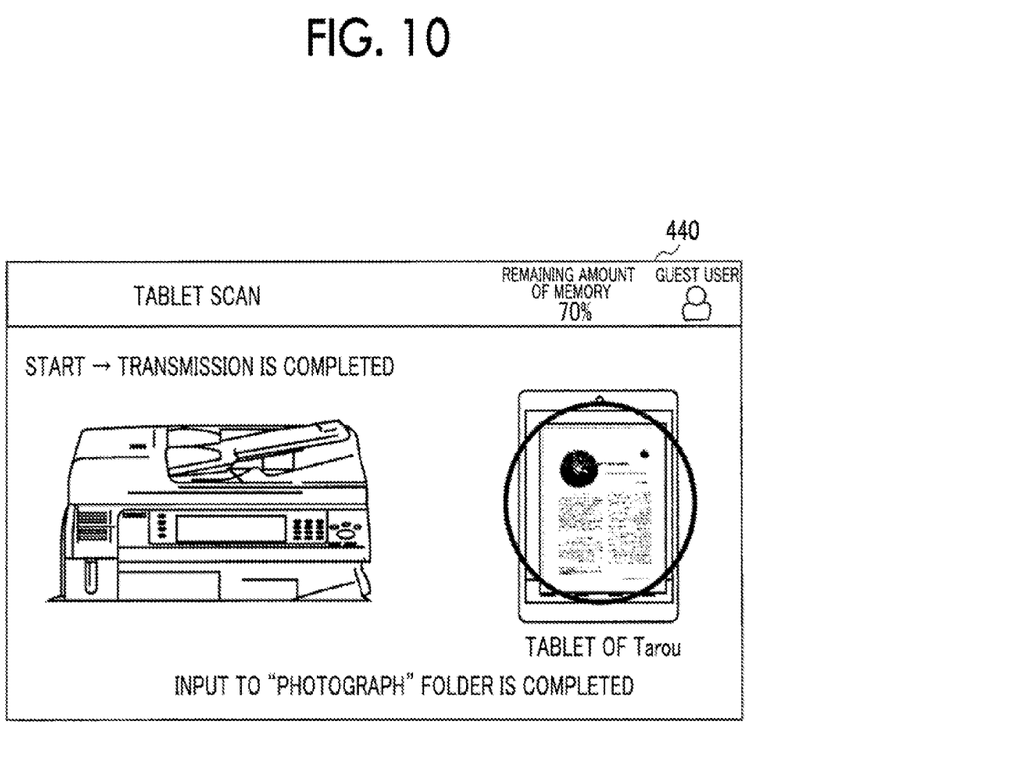
FIG. 10 is a diagram showing a display example of the operation panel when the scan processing of the tablet is completed.

After the terminal of the user is specified, the short range wireless communication unit 107 of the apparatus transmits a signal that actuates the communication application 202 of the terminal (Step S17). Sequentially, operation information for transmitting the image data read by the image reading device to the terminal, and operation information for printing a document inside the terminal by a printing device are added to the display unit. Specifically, for example, a menu or an operation button capable of selecting direct processing between the terminal and the apparatus is added to the operation panel of the apparatus (Step S18). FIG. 7 shows an example of an operation screen 300 displayed on the operation panel in this case. As shown in FIG. 7, a "tablet scan" button 301 and a "tablet print" button 302 are added to general operation menus. Names of the terminal provided by the user are displayed on the buttons. In addition, preferably, an image of a model of the terminal, an icon corresponding to the model, and images by which the terminal may be easily identified are displayed in the vicinities of the buttons. Specifically, when the image of the model of the terminal cannot be acquired, an image of a home screen or a standby screen of the terminal may be displayed. Moreover, in order to indicate that a mode is an operation mode for the guest user, for example, an icon 303 shown in FIG. 7 may be displayed on the operation screen 300.

Moreover, the image forming apparatus may select two modes such as a mode in which the image forming apparatus communicates with the terminal of the guest user using a wireless communication unit and a mode in which wireless communication is not performed. For example, during a time zone in which a manager or a member is not present on a floor on which the image forming apparatus is arranged, for security, the mode in which wireless communication is not performed may be set.

In addition, if a user selects a function of the "tablet scan" or the "tablet print" from the operation screen 300 (Step S19: Y), the selected operation is performed in Step S21. In addition, when the user does not select a function from the operation menus (Step S19: N) and the terminal moves out of the proximity range (Step S20: Y), the process returns to Step S14, and the acquired terminal information is erased. However, similarly to the case of the scanning, from the viewpoint of security, the terminal information of the terminal that is actually connected is encoded and may remain as history.

Scan Processing

Figure 5:
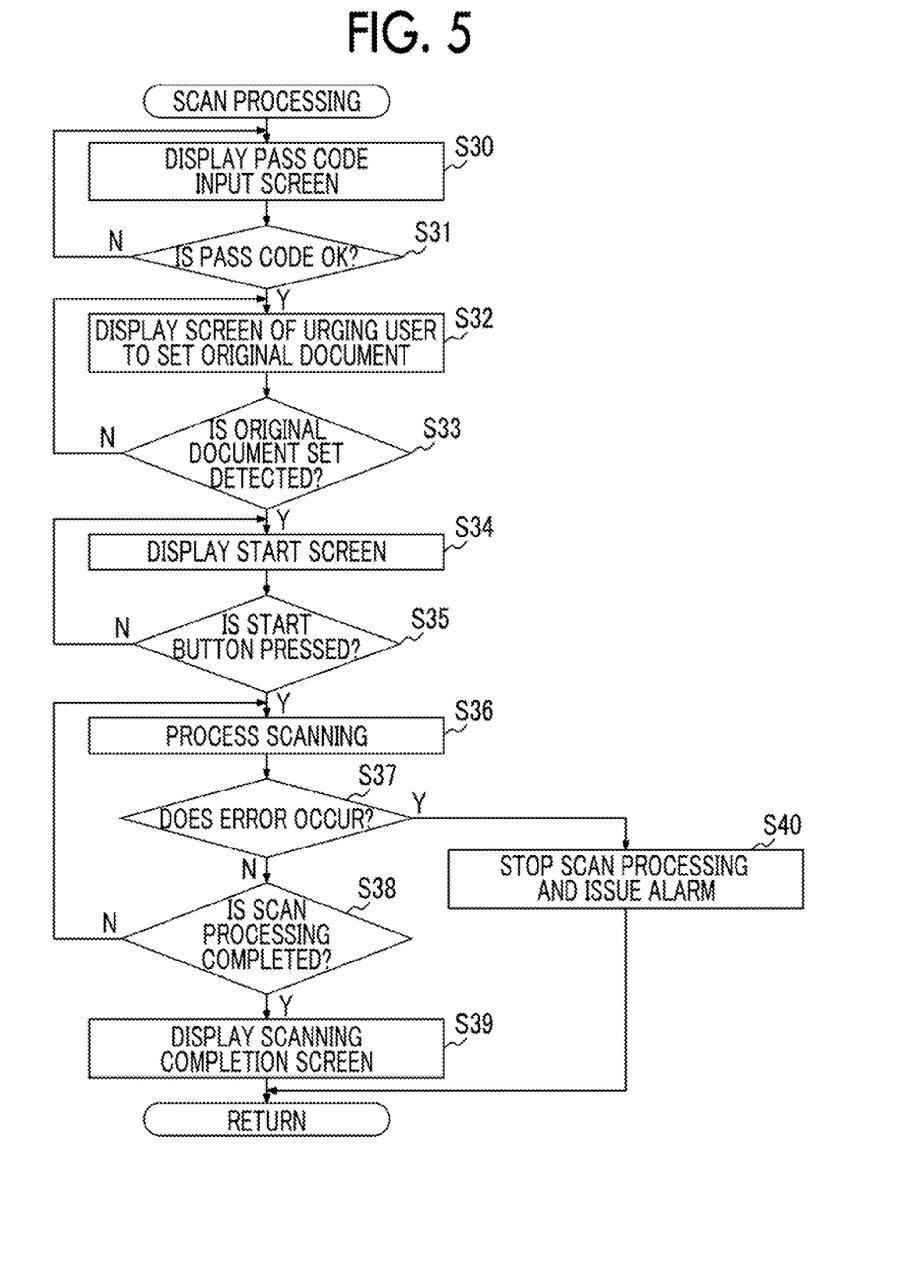
FIG. 5 is a diagram showing a flow of scan processing of the image forming apparatus.

FIG. 5 is a diagram showing a flow of scan processing of the image forming apparatus 100. This flow shows the flow of the processing when the "tablet scan" is selected in Step S19 in FIG. 4. In addition, FIGS. 8A and 8B, FIGS. 9A and 9B, and FIG. 10 show a screen on the operation panel in this case. Hereinafter, the scan processing will be described with reference to FIGS. 5 and 8A to 10.

When the "tablet scan" is selected, in a case where a pass code (password information) is set to the terminal, first, a pass code input screen for requiring the pass code is displayed on the operation panel of the apparatus (Step S30). In this case, an example of the screen display on the operation panel is shown in a screen 400 of FIG. 8A. During communication between the apparatus and the terminal, a remaining amount 401 of a storage region of the terminal may be displayed on the screen 400. The communication application 202 of the terminal transmits a folder name that temporarily stores the image data scanned in this case to the apparatus. In an example of a screen of FIG. 8B, a "photograph" folder of the terminal is displayed as a default. However, this display may be changed according to setting of the communication application 202.

Sequentially, when the input pass code is OK (Step S31: Y), a screen (refer to FIG. 8B) of urging the user to set an original document is displayed on the operation panel of the apparatus (Step S32). In addition, when the apparatus detects the setting of the original document (Step S33: Y), a screen (refer to FIG. 9C) of urging the user to press the start button is displayed (Step S34).

In addition, when the user presses the start button (Step S35: Y), scan processing starts (Step S36). In this case, as shown in FIG. 9D, an animation of indicating that the scanned original document is being transmitted is displayed, and progress of the transmission is displayed by a progress bar 431. In addition, capacity of the transmitted image data may be displayed on the progress bar 431. In addition, the image of the transmitted image data may be sequentially displayed on the terminal side for each page.

Before the scan processing is completed, that is, while the terminal receives the image data, when errors occur due to the terminal moving out of the communication range or the like (Step S37: Y), the scan processing is temporarily stopped, alarm sound is issued, or an alarm image is displayed (Step S40). When the terminal of the user moves out of the communication range of the apparatus during the scan processing, the transmission of the scanned data is disabled, and the terminal moving out of the communication range between the apparatus and the terminal during operation of the user is not preferable in the viewpoint of security.

In addition, when the scan processing is completed (Step S38: Y), a scanning completion screen (refer to FIG. 10) is displayed (Step S39). When the scanning is completed, the final page of the scanned original document may be displayed, and a list of thumbnail images of the scanned original document may be displayed. In addition, even when the scanning is completed, in a case where the original document is left in an original document stand during a certain period of time, alarm is issued.

As described above, in the present scanner, unlike a simple portable storage device such as an external HDD or a USB memory, in order to complete an operation, operations are aggregated at one of UIs of the image forming apparatus side in two UI devices of the UI device of the image forming apparatus and the UI device of the terminal.

Print Processing

Figure 6:
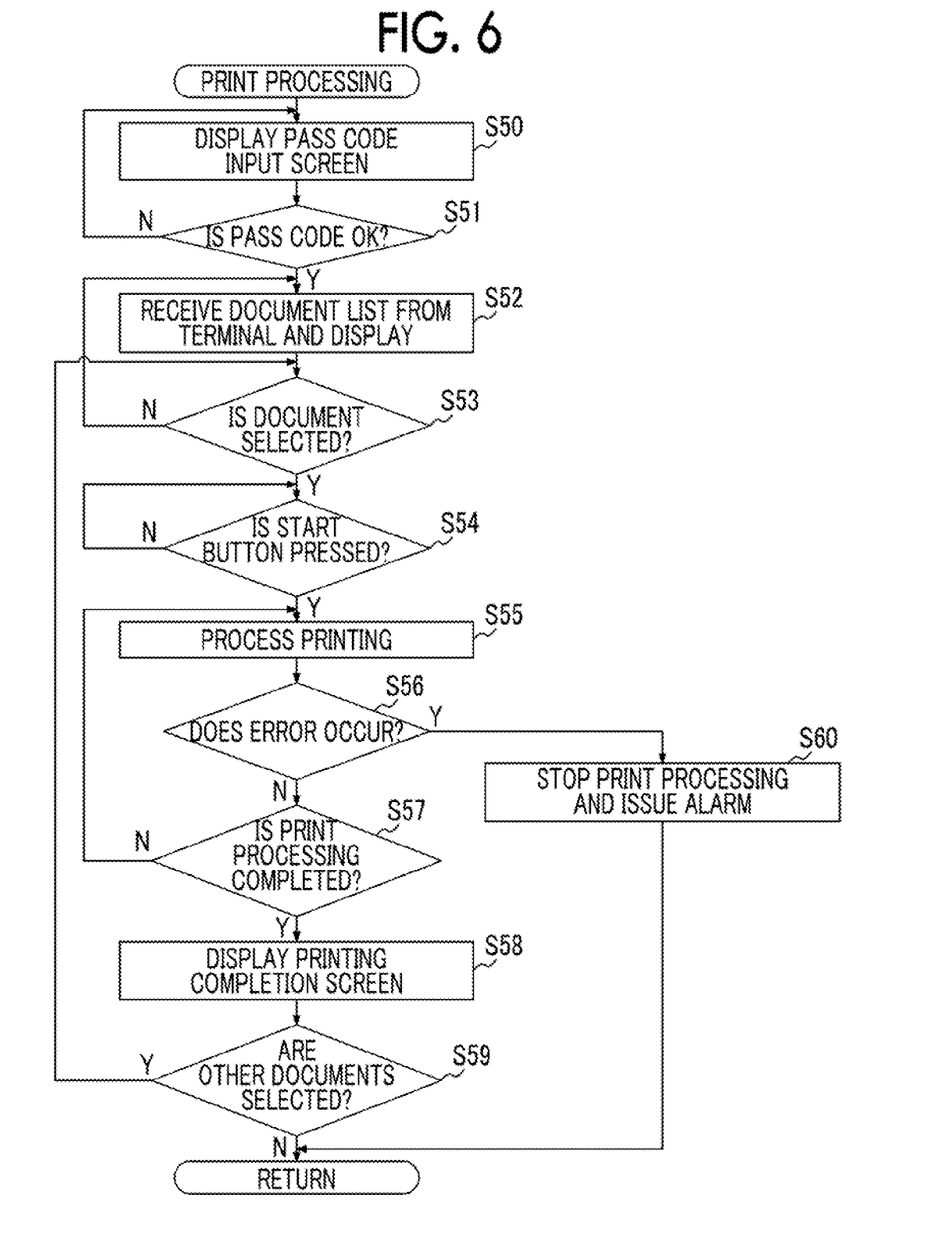
FIG. 6 is a diagram showing a flow of print processing of the image forming apparatus.
Figure 11A:
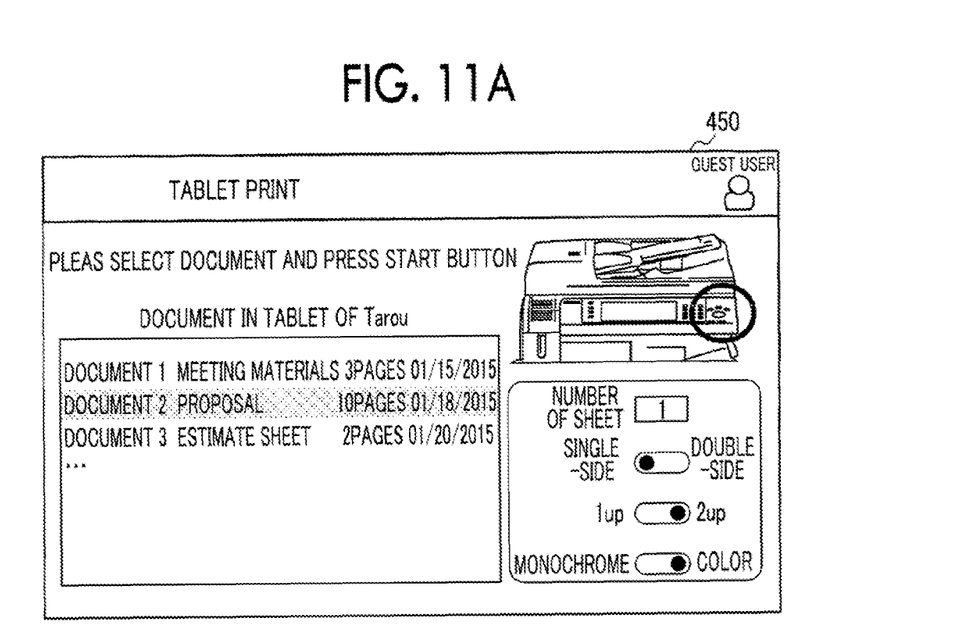
FIGS. 11A and 11B are diagrams showing a display example of the operation panel when printing of the tablet is operated.
Figure 11B:
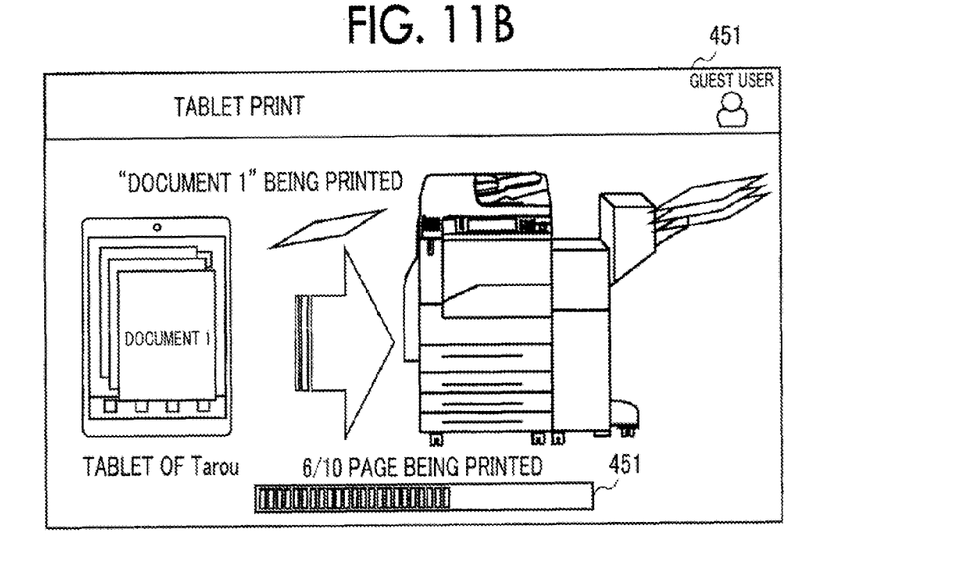

FIG. 6 is a diagram showing a flow of print processing of the image forming apparatus 100. This flow shows a flow of processing when the "tablet print" is selected in Step S19 of FIG. 4. In addition, FIGS. 11A and 11B are diagrams showing a screen on the operation panel during the print processing. Hereinafter, the print processing will be described with reference to FIGS. 6 to 11B.

When the "tablet print" is selected, in a case where a pass code is set to the terminal, first, a pass code input screen is displayed on the operation panel of the apparatus (Step S50). When the input pass code is OK (Step S51: Y), the communication application 202 of the terminal searches a memory region of the terminal, extracts a document file, and transmits a document list to the apparatus. Not only is the searching range a document that is stored in a memory of the terminal, but also the searching range may be a document stored in a cloud assigned to a user when the terminal is positioned at an environment in which the terminal may be connected to the external network using 3G/LTE or the like. In this case, it is necessary to acquire a list of documents in the cloud before the printing is performed. In the apparatus side, a received document list is displayed on the operation panel (Step S52). In this case, an example of a screen on the operation panel is shown in FIG. 11A.

In addition, even though it is not shown, the extracted printable document or document list may be displayed on the terminal side. When each of the documents is displayed on the terminal side, not only an image indicating a document name but also an image indicating a content of a document such as a first page may be displayed.

In addition, a user selects a document from the displayed document list (Step S53: Y) and performs print setting (number of sheets, double-side/single-side, N-up, monochrome/color designation, or the like), thereafter, when the user presses the start button (Step S54: Y), print processing starts (Step S55). In Step S53, plural documents may be selected. When printing starts, as shown in FIG. 11B, an animation of indicating that the selected document is being printed is displayed, and a page during the printing is displayed along with a progress bar 451.

Before the printing processing is completed, that is, during the printing, when errors occur due to the terminal moving out of the communication range or the like (Step S56: Y), the printing is stopped, alarm sound is issued, or an alarm image is displayed (Step S60). However, printing with respect to a print page that has been transmitted to the apparatus is continued. When the terminal moves out of the communication range of the apparatus during the printing, transmission of print data fails. Therefore, from the viewpoint of security, out of paper, paper jam, or the like, it is preferable that the printing with respect to the print page that has been transmitted to the apparatus is continued.

In addition, when the printing processing is completed (Step S57: Y), a printing completion screen (not shown) is displayed on the operation panel (Step S58). When it is determined that other documents to be printed exist (Step S59: Y), the process returns to Step S53, and a document to be printed is selected again. In addition, even when the printing is completed, in a case where a paper is left in an ejection tray during a certain period of time, alarm is issued.

In addition, when the image forming apparatus includes a charging function, charging with respect to a user may be changed according to a case where a document in the terminal of the user is printed by a printing device using a wireless communication unit and a case where a document in the terminal of the user is printed by a printing device without using a wireless communication unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
   an image reading device;
   a display unit that displays operation information of a user;
   a wireless communication unit that wirelessly communicates with a terminal of the user; and
   a processor and memory specifically configured to acquire terminal information of the terminal by the wireless communication unit,
   wherein when proximity of the terminal is detected by the wireless communication unit, the processor adds operation information for transmitting image data read by the image reading device to the terminal to the display unit.

2. The image forming apparatus according to claim 1, wherein the terminal information includes at least one of a model name or a popular name of the terminal, a name of the terminal provided by the user, password information for accessing the terminal, an image of a model of the terminal, an image of a home screen of the terminal, and an image of a standby screen of the terminal, and the terminal information is reflected to the added operation information and is displayed on the display unit.

3. The image forming apparatus according to claim 2, wherein when operation information, which is added to the display unit and is to transmit the image data to the terminal, is indicated, password information for accessing the terminal is required.

4. The image forming apparatus according to claim 1, wherein when operation information, which is added to the display unit and is to transmit the image data to the terminal, is indicated, password information for accessing the terminal is required.

5. The image forming apparatus according to claim 1, further comprising at least one of:
   a human detection sensor that detects the user standing before the image forming apparatus; and
   an imaging unit that images an appearance of the user.

6. The image forming apparatus according to claim 1, wherein an image receiving unit that receives image data read by the image reading device in the terminal is actuated according to proximity of the terminal to the image forming apparatus.

7. The image forming apparatus according to claim 1, wherein when errors occur while the image data is received, alarm sound is issued or an alarm image is displayed on the display unit.

8. The image forming apparatus according to claim 1, wherein at least one of a remaining amount of a storage region of the terminal and capacity of the image data is displayed on the display unit while the image data is transmitted.

9. The image forming apparatus according to claim 1, wherein a mode in which the image forming apparatus communicates with the terminal unit using the wireless communication unit, and a mode in which the image forming apparatus does not communicate with the terminal unit using the wireless communication unit is selectable.

10. The image forming apparatus according to claim 1, wherein the image data that is read by the image reading device is displayed on the display unit of the terminal.

11. The image forming apparatus according to claim 1, wherein the operation information added to the display unit is an icon identifying the terminal.

12. The image forming apparatus according to claim 1, wherein:
   the terminal information is acquired in response to detecting that the terminal is within a communication range of the wireless communication unit, and
   in response to detecting that the terminal is within a proximity range that is closer to the wireless communication unit than the communication range, the operation information for transmitting image data read by the image reading device to the terminal is added to the display unit.

13. The image forming apparatus according to claim 1, wherein:
   when proximity of the terminal is detected by the wireless communication unit, operation information for printing image data stored in the terminal is added to the display unit, and
   in response to the operation information for printing image data being selected by the user, the image data stored in the terminal is listed on the display unit.

14. The image forming apparatus according to claim 1, wherein:
   the operation information for transmitting image data read by the image reading device to the terminal is added to the display unit when proximity of the terminal is detected by the wireless communication unit for a certain period of time or more, and
   the operation information for transmitting image data read by the image reading device to the terminal is not added to the display unit when proximity of the terminal is detected by the wireless communication unit for less than the certain period of time.

15. The image forming apparatus according to claim 1, wherein:
   the display unit displays first operation information,
   the operation information for transmitting image data read by the image reading device to the terminal is second operation information different than the first operation information, and
   when proximity of the terminal is detected by the wireless communication unit, the second operation information is added to the display unit already displaying the first operation information so that the first operation information and the second operation information are simultaneously displayed by the display unit.

16. The image forming apparatus according to claim 1, wherein in response to the user selecting the operation information added to the display unit, the image data read by the image reading device is transmitted to the terminal.

17. An image forming system, comprising:
   a terminal of a user, including a unit that receives image data by wireless communication; and
   an image forming apparatus that includes:
   an image reading device;
   a display unit that displays operation information of the user;
   a wireless communication unit that wirelessly communicates with the terminal of the user; and
   a processor and memory specifically configured to acquire terminal information of the terminal by the wireless communication unit,
   wherein the processor of the image forming apparatus adds operation information for transmitting image data read by the image reading device to the terminal to the display unit when proximity of the terminal is detected by the wireless communication unit.

18. A non-transitory computer readable medium storing a program causing a computer to execute a process in an image forming apparatus including an image reading device, a display unit, and a wireless communication unit, the process comprising:
   displaying operation information of a user on the display unit;
   acquiring terminal information of a terminal of the user by the wireless communication unit; and
   adding operation information for transmitting image data read by the image reading device to the terminal to the display unit when proximity of the terminal is detected by the wireless communication unit.

* * * * *